United States Patent Office 3,070,584
Patented Dec. 25, 1962

3,070,584
METHOD OF PRECIPITATING POLYMER FROM AQUEOUS LATEX USING POLYETHER THIOETHER GLYCOL AS HEAT SENSITIZER
Hanswilli von Brachel and Heinz Esser, Koln-Sulz, and Hans Holtschmidt, Koln-Stammheim, and Gustav Sinn, Bergisch Neukirchen, Germany, assignors to Farbenfabriken Bayer Aktiengesellschaft, Leverkusen, Germany, a corporation of Germany
No Drawing. Filed Aug. 26, 1958, Ser. No. 757,188
Claims priority, application Germany Aug. 30, 1957
5 Claims. (Cl. 260—85.1)

This invention relates to heat-sensitising agents.

In the production of shaped articles, dipped articles and foam rubber articles from latices of high molecular organic compounds such as rubber latex, synthetic rubber and plastic dispersions or emulsions, so-called heat-sensitisers have recently been employed. By heat-sensitisers, there are to be understood compounds which are added in aqueous solution to the latex or the plastic dispersion and which, because of their insolubility in hot water, precipitate when the mixture is heated, the rubber or the plastic being carried down as an irreversible coagulate. If the latex mixture is beaten into a foam to the heating, it coagulates while maintaining its shape and foam structure. In order to manufacture the dipped article, a former at a temperature of, for example, 50 to 60° C. is dipped into a mixture which contains heat-sensitisers. This mixture then only coagulates on the surface of the former and separates out thereon as a fine film, the thickness of which depends on the dipping time, the temperature of the former and the concentration of the mixture.

It is an object of the present invention to provide novel heat-sensitising agents. Another object is to provide novel heat-sensitising agents which are easily soluble in water. Still another object is to provide heat-sensitising agents, the desired properties of which can be easily influenced by the process of their production; more objects will appear hereinafter.

These objects are attained in accordance with the present invention by using polyether thioethers as heat-sensitisers for the latices of high molecular organic compounds such as rubber latex, synthetic rubber emulsions or dispersions or plastic emulsions or dispersions.

By the expression "polyether thioethers" there are to be understood those polyethers in which some of the ether-oxygen is replaced by sulfur. In the process according to the invention, it is preferred to use polyether thioethers which on average contain at least one ether oxygen atom to 3 to 4 carbon atoms and which in addition contain at least one additional ether-oxygen bond to each thioether bond. It is also preferred to use compounds of this type which have a molecular weight from about 500 to about 20,000 or more preferably 10,000.

The polyether thioethers used for the novel process can be prepared, for example, by reacting polyether glycols of the general formula

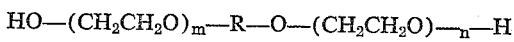

wherein R stands for an alkylene, cycloalkylene, or arylene radical which may contain hydroxyl groups and/or oxalkylated hydroxyl groups, and where $m$ and $n$ are integers, the sum of which is from 6 to about 200, preferably from 8 to about 100 and more preferably from 15 to about 100; with thioether glycols of the general formula

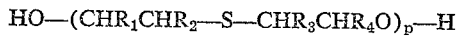

wherein $R_1$, $R_2$, $R_3$, and $R_4$ stand for hydrogen or for the same or different alkyl, cycloalkyl, or aryl radicals, and $p$ denotes an integer of from 1 to about 200 and preferably from 1 to about 100.

Preferably, the glycols are prepared by condensation of the starting materials set forth above at elevated temperatures, such as, for example, between about 140° C. to about 220° C., and in the presence of any suitable dehydrogenation catalysts, such as, for example, p-toluene sulfonic acid or phosphoric acid.

The components are preferably used in proportions so that the resulting glycol contains at least about three ether-like oxygen atoms per one ether-like sulfur atom.

Any suitable polyether glycol having the above formula may be used, such as, for example, octaethylene glycol, dodecaethylene glycol, hexadecaethylene glycol, decaoxethylated butanediol-1,4, decaoxethylated trimethylolpropane, pentadecaoxethylated hydroquinone and oxethylated resorcinol of a molecular weight of about 1000. Any suitable thioether glycol having the above formula may be used, such as, for example, thiodiglycol, beta,beta'-dimethyl-thiodiglycol, and beta, beta'-diphenyl-thiodiglycol, as well as the products obtainable therefrom by self condensation. These components are preferably used in proportions by weight in the range of from about one part polyether glycol per two parts thioether glycol, to three parts polyether glycol per one part thioether glycol.

If desired, any suitable monohydric or polyhydric alcohol, such as, for example, ethyl alcohol, oleyl alcohol, glycerol, pentaerythritol, or the like may also be added to the reaction mixture and condensed with the components specified in the foregoing paragraph to produce the glycol.

The hydroxyl numbers and molecular weights of the linear polyether-thioether glycols may be readily correlated with one another. For instance, if the glycol has a molecular weight of 500, then the hydroxyl number will be 224. If the glycol has a molecular weight of 1000, then the hydroxyl number is 112. If the glycol has a molecular weight of 2000, then the hydroxyl number is 56.

The polyether thioethers used by the process of the present invention can be obtained also by copolymerisation of alkylene oxides, such as ethylene oxide, propylene oxide, cyclo-hexenchloride or styrene oxide with alkylene sulfides. If desired, there can be added mono- or polyvalent alcohols or their oxalkylation products. Furthermore, there can be used for the process of the invention the derivatives of polyether thioether glycols, such as the esters, ethers or urethanes. These derivatives can be obtained, for example, by reaction of the polyether thioether glycols with aliphatic or aromatic carboxylic acids or the acid chlorides or anhydrides thereof or they can be obtained by reaction of the polyether thioether glycols with alcohols in the presence of dehydration catalysts, or by reaction of the polyether thioether glycols with isocyanates or isothiocyanates. Furthermore, derivatives of said polyether thioether glycols can be obtained by reaction with compounds containing double-bonds capable of addition, such as acrylonitrile, vinyl ethyl sulfone or butadiene sulfone.

Examples of the high molecular organic compounds the latices of which can be used by the process of the invention are the synthetic rubber-like polymers which can be obtained for instance from conjugated diolefins such as butadiene, dimethylbutadiene, isoprene and their homologues or copolymers of conjugated diolefins with polymerizable vinyl compounds such as styrene, α-methyl-styrene and their substitution products, acrylonitrile, methacrylonitrile, acrylates and methacrylates and similar compounds or copolymers which are obtained from iso-olefins such as isobutylene and its homologues with a small amount of conjugated diolefins. Furthermore, there are suitable the polymerizates obtained from chlorobutadiene and its co-polymerizates obtained with mono- and/or di-olefins or other polymerizable vinyl compounds. Furthermore, there can be used e.g. latices of high polymer plastics, such as polyvinylacetate, polyacrylic acid esters, polyvinyl chloride etc.

The polyether thioether glycols can be added to the latices of the high polymers in varying amounts e.g. in amounts of 0.5–20% by weight preferably 1–10% by weight based on the amount of the high polymer.

One particular advantage of the polyether thioethers used according to the invention consists in that the properties of the polyether thioethers can be varied during the manufacture thereof by varying the reaction components or by altering the molecular weight. Thus, it is possible by such a variation, for example, to obtain compounds with a coagulation point between 30 and 80° C.

Another advantage of the polyether thioethers used according to the invention is to be seen from the fact that plasticizers etc. can in general be added to the latex mixture without particular emulsifiers being necessary for the addition. Furthermore, the polyether thioethers used in the novel process are readily soluble in water in the cold state, this making it possible that an aqueous solution of the sensitiser can be produced at the actual place of use. The sensitisers used according to the invention do not have to be washed out of the vulcanisates, since they do not make the said vulcanisates tacky. Furthermore, vulcanisation and ageing are not unfavourably influenced.

*Example 1*

A rubber latex mixture having the following composition:

100.0 grams of natural rubber=167 grams of rubber latex, 60%
2.5 grams of zinc oxide,
2.5 grams of sulfur,
0.8 gram of zinc diethyl dithiocarbamate,
5.8 grams of a 5% aqueous solution of methylene-bis-naphthalene sulfonate,
0.4 gram of stabiliser, and
8.5 gram of formaldehyde, about 30% had added thereto in each case 10 to 15 cc. of a 15–30% aqueous solution of the heat-sensitiser. The quantities and the coagulation temperatures produced are more accurately shown in the following table:

| Ratio of starting components | Mol weight | Heat sensitiser | | Coagulation temperature, °C. |
|---|---|---|---|---|
| | | Cc. | Concentrat., percent by weight | |
| (a) | | | | |
| 0.9 mol tetraethylene glycol+1 mol thiodiglycol | 850 | 10 | 30 | 33 |
| 0.35 mol octaethylene glycol+1 mol thiodiglycol | 550 | 10 | 30 | 37 |
| 0.35 mol octaethylene glycol+1 mol thiodiglycol | 1,720 | 10 | 30 | 41 |
| 0.48 mol octaethylene glycol+1 mol thiodiglycol | 980 | 10 | 30 | 43 |
| 0.55 mol decaethylene glycolmonobutylether+1 mol thiodiglycol | About 1,400 | 8 | 15 | 50 |
| 0.48 mol octaethylene glycol+1 mol thiodiglycol | 1,900 | 10 | 30 | 60 |
| 0.48 mol octaethylene glycol+1 mol thiodiglycol | 8,800 | 10 | 30 | 61 |
| 0.5 mol dodecaethylene glycol+1 mol thiodiglycol | 1,540 | 10 | 30 | 62 |
| 0.55 mol octaethylene glycol+1 mol thiodiglycol | 7,700 | 15 | 15 | 66 |

Similar results are obtained if instead of the above polyether thioether glycols there are used the esters obtained by reaction with acetic acid anhydride, propionic acid anhydride, stearic acid, oleic acid, benzoyl chloride, naphthoyl chloride or cyclohexane carboxylic acid or ethers obtained by reaction of the polyether thioether glycols with acrylonitrile or butadiene sulfone in the presence of sodium methylate or the urethanes obtained by reaction with hexane isocyanate or phenylisocyanate.

| Ratio of starting components | Mol weight | Heat sensitiser | | Coagulation temperature, °C. |
|---|---|---|---|---|
| | | Cc. | Concentrat., percent by weight | |
| (b) | | | | |
| 1 mol ethylene glycol+40 mols ethylene oxide+9 mols ethylene sulfide | 2,300 | 10 | 30 | 42 |
| 1 mol butane diol+80 mols ethylene oxide+20 mols ethylene sulfide | 2,600 | 10 | 30 | 45 |
| 1 mol ethylene glycol+40 mols ethylene oxide+8 mols ethylene sulfide+3 mols propylene oxide | 2,500 | 10 | 30 | 42 |

The polyether thioethers mentioned above under (a) can, for example, be produced by the following process:

0.48 mol of octaethylene glycol and 1 mol of thiodiglycol are heated with addition of 3 grams of o-phosphoric acid in a weak stream of nitrogen to 180° C. until it is clear from the determination of the hydroxyl number that the condensation product has an average molecular weight of approximately 980. The product is obtained with a yield of 97%.

Using the same process, it is possible to obtain the other polyether thioethers by using in each case the reaction components in the proportions indicated above and by stopping the condensation in each case on reaching the desired average molecular weight.

The polyether thioethers mentioned under (b) can be obtained by heating the reaction components 5–8 hours in the presence of the 3 to 5-fold volume amount of a solvent, such as dioxane, ether or benzene in the presence of 0.1–1% by weight of a 20–40% dispersion of sodium in vaseline.

*Example 2*

A synthetic latex of the following composition:

100.0 grams of poly-2-chlorobutadiene=200 g. poly-2-chloro-butadiene latex, 50%
5.0 grams of zinc oxide,
1.0 gram of sulfur,
1.5 grams of zinc diethyldithiocarbamate,
5.8 grams of a 5% aqueous solution of methylene-bis-naphthalene sulfonate,
0.4 gram of stabiliser (hydroxyethylated polycyclic phenol)
2.0–3.0 grams of aminoacetic acid has added thereto 12.5 to 15 cc. of a 15% aqueous solution of the polyether thioethers indicated below.

By means of the aminoacetic acid, the pH value of the poly-2-chlorobutadiene latex is adjusted to 9.5. The exact quantities, the coagulation temperatures and the composition of the polyether thioethers will be seen from the following table:

| Composition of polyether thioether | Mol. weight | Cc. glycol | Coagulation temperature, degrees |
|---|---|---|---|
| 0.4 mol decaethylene glycol+1 mol β,β'-dimethylthiodiglycol | 1,800 | 12.5 | 35 |
| 0.4 mol dodecaethylene glycol+0.5 mol β,β'dimethylthiodiglycol+0.5 mol thiodiglycol | 2,000 | 15 | 46 |

*Example 3*

To 250 parts by weight of a copolymerisate of butadiene and styrol, N/10 mineral acid is added until a pH of 7.5 is obtained. Thereafter there are added 3.5 parts by weight of a sodium salt of methylene-bis-(naphthaline sulfonic acid), 20 parts by weight of water, 5 parts by weight of zinc oxide, 3 parts by weight of sulfur, 2 parts by weight of zinc dibutyl-dithiocarbamate and 10–30 parts by weight of an aqueous 15 percent solution of one of the polyether thioethers, described in Example 1.

The coagulation temperatures of these mixtures are within the temperature range of 30–55° C.

*Example 4*

A mixture is prepared consisting of an aqueous 50 percent latex of a copolymerisate of butadiene and acrylic acid nitrile, 5.3 parts by weight of a disodium salt of methylene-bis(naphthaline sulfonic acid), 60 parts by weight of water, 5 parts by weight of zinc oxide, 3 parts by weight of sulfur, 0.8 parts by weight of 2-mercapto-benzo-thiazole, 0.2 part by weight of diphenylguanidine and 15–40 parts by weight of an aqueous solution of one of the polyether thioethers described in Example 1. The coagulation temperatures or the mixtures thus obtained are within a temperature range of 30–55° C.

*Example 5*

The plastic dispersions respectively emulsions indicated in the following table are brought to a pH of 7.5 by adding N/10 mineral acid. Thereafter 20–50 parts by weight (based on the content of the dry plastic) of an aqueous 15 percent solution of the polyether thioethers mentioned in Example 1 are added. The ccagulation temperatures of the mixtures obtained are indicated in the following table:

| | Coagulation temperature, ° C. |
|---|---|
| (a) Polyvinylacetate (a 45 percent dispersion) | 39–55 |
| (b) Polyacrylic acid methylester (a 40% dispersion) | 41–52 |
| (c) Polyvinylchloride (a 50% dispersion) | 35–55 |

We claim:

1. A process for precipitating at a predetermined temperature a latex of a polymer selected from the group consisting of natural rubber, homopolymers of conjugated dienes, copolymers of conjugated dienes with polymerizable vinyl monomers, copolymers of conjugated dienes with isoolefins, polyvinyl acetate, polyacrylic acid esters, and polyvinyl chloride, which comprises incorporating into said latex as a heat-sensitizing agent an aqueous solution of a water-soluble polyether thioether glycol containing at least one ether-oxygen atom per 3–4 carbon atoms and also containing at least two ether-oxygen bonds to each thioether bond and having a molecular weight from about 500–20,000, said latex being otherwise devoid of coagulating agents, and then heating the latex to a temperature at which the polyether thioether glycol becomes insoluble and precipitates, thereby simultaneously precipitating the polymer content of the latex.

2. The process of claim 1 wherein said polymer is polychlorobutadiene.

3. The process of claim 1 wherein said polymer is a butadiene-styrene copolymer.

4. The process of claim 1 wherein said polyether thioether glycol is prepared by heating octaethylene glycol and thiodiglycol to a temperature of 140–220° C. in the presence of a dehydration catalyst.

5. The process of claim 1 wherein said polyether thioether glycol is prepared by heating decaethylene glycol and beta,beta'-dimethylthiodiglycol to a temperature of 140–220° C. in the presence of a dehydration catalyst.

References Cited in the file of this patent

UNITED STATES PATENTS

| 2,215,562 | Ogilby | Sept. 24, 1940 |
| 2,518,245 | Morris et al. | Aug. 8, 1950 |
| 2,769,713 | Wilson | Nov. 6, 1956 |
| 2,828,220 | McWherter | Mar. 25, 1958 |
| 2,900,368 | Stilmar | Aug. 18, 1959 |
| 2,905,720 | De Benneville et al. | Sept. 22, 1959 |
| 2,905,721 | De Benneville et al. | Sept. 22, 1959 |

FOREIGN PATENTS

| 643,456 | Great Britain | Sept. 20, 1950 |